May 9, 1967
T. H. HOULE
3,318,479
DATA ACQUISITION MONITORING SYSTEM
Filed July 6, 1964
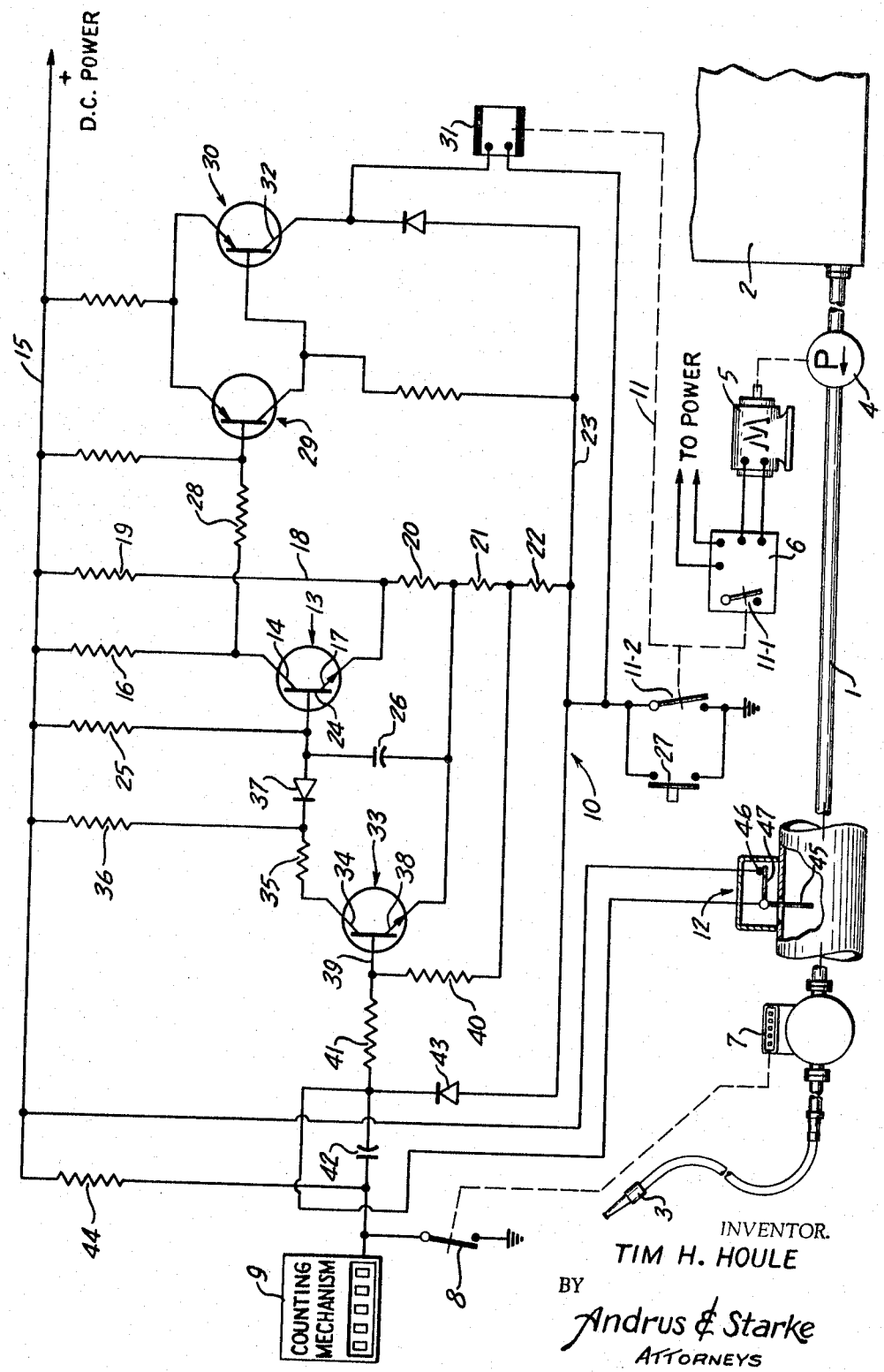
INVENTOR.
TIM H. HOULE
BY
Andrus & Starke
ATTORNEYS //www.google.com/patents/US3318479

United States Patent Office 3,318,479
Patented May 9, 1967

3,318,479
DATA ACQUISITION MONITORING SYSTEM
Tim H. Houle, Wauwatosa, Wis., assignor to A. O. Smith Corporation, Milwaukee, Wis., a corporation of New York
Filed July 6, 1964, Ser. No. 380,400
8 Claims. (Cl. 222—23)

This invention relates to a data acquisition monitoring system and particularly to a system wherein a pulse train is generated in accordance with a load or function to be detected and recorded.

In metering systems such as remote inventory controls and unattended bulk loading stations for gasoline dispensing and the like, a flow meter is advantageously coupled to and mechanically actuates a switch interconnected in a pulsing circuit to generate a train of pulses of a frequency of repetition rate corresponding to the flow rate. A digital counter or other suitable similar control device is connected to the output of the pulsing circuit and actuated by the pulse train to record the flow. An example of a highly satisfactory unattended bulk loading station for petroleum products is disclosed in the copending application of Tim H. Houle and John A. Russell, Ser. No. 380,379, now Patent No. 3,252,620, entitled Dispensing and Metering Control, filed on the same date as this application, and assigned to a common assignee herewith. In the event of a breakdown in the meter, the transmitter switch mechanism in the connection therebetween or the like, continued flow and dispensing of the liquid will result in inaccurate recording of the amount of dispensed material.

The present invention is particularly directed to an improved circuit and system for terminating and preventing discharge if the pulse system is inoperative for any reason. In accordance with this invention, an overriding control means responsive to each pulse of the pulse train is connected to control continued operation of the load or function.

In accordance with the present invention, a timing circuit is interconnected between the pulse transmitting circuit and an overriding control means. The timing circuit is reset upon receiving of each pulse such that the overriding control means is maintained de-energized during normal operation. If for any reason the pulse transmitting system is interrupted or the mechanical parts operate defectively, a resetting pulse will not be applied to the timer and the overriding control will be energized to disconnect or stop further flow. A flow responsive switch is interconnected into the timing circuit to normally hold it in a condition whereby the overriding control will permit initial starting of the circuit. Once flow is established, the flow responsive switch is opened such that the resetting pulses must be established to the circuit in order to prevent disconnect of the system. Thus, the circuit provides for conditioning of the circuit for normal operation but provides a positive interlocking system in the event that the pulse transmitting circuit fails. This will insure proper counting or recording of the dispensed liquid or other material being metered.

The timing circuit preferably includes a pair of transistors interconnected by a resistance capacitive coupling circuit such that one transistor is biased to conduct after a timing period determined by a timing capacitor and a second transistor which is normally cut off and connected in a capacitor discharge circuit. In accordance with the present invention, the normally conducting transistor is interconnected to condition the load for normal operation. The non-conducting transistor is connected to the pulse circuit and also to a flow responsive switch. In the absence of flow, a signal is applied to the normally non-conducting transistor by the flow responsive switch to hold it conducting and thereby turn off the normally conducting transistor. As a result, the overriding control device is held inactive. When flow is initiated, the flow responsive switch opens. If flow generated pulse signals are not initiated, the normally conducting transistor turns on and breaks the load conditioning circuit. If flow generated pulses are formed by the transmitter, pulses are applied to the normally non-conducting transistor to turn it on and thereby turn off the normally conducting transistor. The removal of the pulse establishes the timing period, with the length of the time period determined by the resistance and capacitance of the circuit. If the pulse train is interrupted for any reason for a longer period than the selected timing period, the normally conducting transistor is turned on and thereby maintains the overriding control device in an inoperable or disenabled condition.

The present invention provides a very reliable and long life failure control system which can be applied to provide reliable recording of the flow in an inventory control system and the like.

The drawing furnished herewith illustrates a preferred construction incorporating the present invention and clearly disclosing the operation and advantages, as noted above, as well as others which will be clear to those skilled in the art.

The drawing is a diagrammatic illustration of a fluid pumping system incorporating a schematic control circuit for operating an overriding control relay device.

Referring to the drawing, a liquid dispensing line 1 is shown connected at an inlet end to the storage tank 2 and at a discharge end to a discharge nozzle 3. A motor-driven pump 4 is inserted in the line 1 and operably connected to the output of a drive motor 5. A control unit 6 is shown interconnecting the motor 5 to a suitable source of alternating current power for selective operation of the motor and driving of the pump 4 whenever it is desired to withdraw the product from the tank 2 through the line 1. A flow meter and pulse generating unit 7 is also connected in the flow line 1 and provides a mechanical output proportional to the flow through the line 1. The flow meter and generating unit 7 is coupled to cyclically actuate a switch 8, once for each unit of flow. A highly satisfactory pulse forming switch circuit is shown in the copending application of Walter L. Probert entitled Pulse Transmission Apparatus, which was filed on Jan. 29, 1962, with Ser. No. 169,416, and is assigned to a common assignee. In the illustrated embodiment of the invention, the switch 8 is momentarily closed once for each unit of volume flow to provide a complete circuit path for the corresponding time and thereby generates a train of electrical pulses. The switch 8 is interconnected to a digital counting mechanism 9, as shown by the dotted connecting line, to provide a direct account of the flow through the line 1. The counting mechanism 9 may be any suitable device responsive to a series of pulses and no further description thereof is given. In accordance with this invention, a safety interlocking circuit 10 includes an overriding conditioning or control relay 11 having contacts 11-1 interconnected in the circuit of the control unit 6, for controlling withdrawal of liquid from storage tank 2. Other forms of interlocking controls such as control of a downstream block valve, not shown, may be desirable for practical reasons and may be used. The system shown in the drawing is given for purposes of diagrammatic illustration.

The control relay contacts 11-1 are normally closed by energizing of relay 11 through circuit 10 to permit normal operation of the control unit 6 through any suitable manual or automatic input switch means, not shown. However, in the event of failure of the operation of generating unit 7, the switch 8 or the like with a resulting interruption of transmission of pulses to the safety interlock circuit 10, the control relay 11 will be de-energized to open the associated contacts 11–1 and prevent operation of the pump 4. Consequently, flow through the line 1 will terminate to prevent unrecorded discharge of the product.

The safety interlock circuit 10, as presently described, is thus biased to deactivate the control relay 11 and lock out or disable the control unit 6. The relay 11, as hereinafter described, includes a holding or interlock circuit which holds itself in the de-energized state once energized and requires a manual resetting of the circuit by authorized personnel.

A standby or flow responsive switch 12 is provided in the line 1 and applies a holding signal to the safety interlock circuit 10 in the absence of flow to prevent de-energization of the control relay 11 and thereby condition the control unit 6 for operation. The switch 12 is actuated by flow in line 1 to open the holding circuit 10 and thereby provide timed operation under the resetting control of pulses generated as a result of the periodic actuation of switch 8 by the generating unit 7.

The illustrated embodiment of the invention is briefly summarized as follows. The switch 12 normally conditions the interlock circuit 10 to hold the relay 11 operative whereby its contacts 11–1 are held closed to condition the control unit 6 for normal operation. Control unit 6 may then be selectively actuated to energize the motor 5 and operate the pump 4 and initiate flow through the line 1. The initial flow to the line 1 will simultaneously open the flow responsive switch 12 and drive the flow meter and pulse generating unit 7. The opening of the flow responsive switch 12 removes the holding signal from the interlock circuit 10 which begins a timing period after which it will de-energize the relay 11 causing it to open its contacts and thereby terminate flow and require resetting of the system. However, each actuation of the switch 8 generates an input pulse which is not only transmitted to the counting mechanism 9 but is also applied to the interlock circuit 10. Each pulse resets the timing cycle to standby such that as long as pulses are received at a rate in excess of the timing period, the control relay 11 will be maintained energized and the control unit 6 will be held in its normal position. The standby or flow responsive switch 12 maintains the circuit operative during the standby period when no product flows.

More particularly, the illustrated interlock circuit 10 includes a control or disconnect transistor 13 which is a normally conducting transistor; i.e., biased to conduct as presently described. The illustrated transistor 13 is shown connected in a common emitter circuit including a collector 14 connected to a positive voltage line 15 in series with a load resistor 16.

Transistor 13 also includes the emitter 17 connected to the positive voltage line 15 through a voltage dividing network 18 which serially includes the biasing resistors 19, 20, 21 and 22 connected between the line 15 and a ground connection line 23. Transistor 13 further includes a base 24 connected by a resistor 25 to the positive voltage line 15 and to the junction of resistors 20 and 21 by a capacitor 26. The transistor 13 is thus biased to conduct by the forward bias across the base 24 and the emitter 17 when capacitor 26 is charged to a selected level. The transistor 13 is shown as an NPN transistor by the conventional symbol.

If a PNP transistor were employed, the voltage line would be made negative to reverse the voltage connections just described as well as the others in accordance with well known transistor circuit design.

The ground line 23 is connected to a ground, shown by the usual diagrammatic symbol, in series with a set of normally open relay contacts 11–2. Thus, when transistor 13 conducts and de-energizes relay 11, the ground circuit is opened at contacts 11–2 and must be reset by closing of a reset switch 27 to provide power to circuit 10 before relay 11 can be again energized.

The reset switch 27 is connected in parallel with the normally open relay contacts 11–2. Closing of the reset switch 27 completes the circuit through the control relay 11 which then closes the contacts 11–2 to establish and maintain the ground connection. The relay contacts 11–1 will also be closed to condition the control unit 6 for operation.

A resistor 28 direct couples the collector 14 of transistor 13 and to the input of a two stage, direct coupled inverting amplifier including cascaded amplifying transistors 29 and 30 interconnected in a biasing and load circuit of known design.

The relay 11 is shown having a coil 31 connected between the collector 32 of transistor 30 and ground line 23 and thereby in series with the interlock relay contacts 11–2 and reset switch 27 for connection to ground. The relay can be a 24-volt double-pole, double-throw relay having contacts 11–1 adapted to carry the necessary power current in control unit 6 as well as the interlocking contacts 11–2.

The direct coupled inverting amplifier increases the level of the output signal to operate the relay 11 which is connected in the output circuit of transistor 30 and inverts the output of transistor 13 as applied to relay 11. When transistor 13 is non-conducting, the input to transistor 29 is essentially at the voltage of line 15 and consequently transistor 29 is biased off and transistor 30 is biased on to energize relay 11 and close the associated contacts 11–1 and 11–2. Conversely, when transistor 13 conducts, the input to transistor 29 is at a lesser voltage and transistor 29 conducts turning transistor 30 off such that relay 11 is also de-energized. Transistor 13 must therefore be held off during standby and a normal pumping operation.

In order to maintain energization of the relay 11, the transistor 13 is held de-energized by proper biasing of a restting transistor 33 which is connected in the base circuit of transistor 13. Transistor 33 is similar to the transistor 13 and includes a collector 34 connected to the positive voltage line 15 in series with a resistor 35 and a resistor 36. A diode 37 is interconnected between the junction of the resistors 35 and 36 and the base 24 of the transistor 13 and polarized to prevent current flow therethrough to transistor 13. An emitter 38 is connected to the ground line 23 in series with the resistors 21 and 22 and the base 39 is connected to ground in series with a base resistor 40 and the voltage dividing resistor 22.

In operation, transistor 33 is thereby normally biased to cutoff or non-conducting state in the absence of a negative voltage signal impressed on its base 39 by switches 8 or 12, as subsequently described. A charging current flows through the capacitor 26 from lead 15 through resistor 25, capacitor 26 and resistors 21 and 22 to ground line 23. The charge on the capacitor 26 increases and at a selected voltage level the positive bias applied to the base 24 of transistor 13 causes the latter to conduct and remain conducting until the capacitor 26 is discharged. This, as previously described, turns on transistor 29 and turns off transistor 30. As a result, relay 11 is deenergized and locks out the control.

When the transistor 33 is turned on as a result of the input trigger signal from the generating unit 7 or flow switch 12, the capacitor 26 will discharge through the circuit of diode 37, resistor 35 and the collector-emitter circuit of the transistor 33. After transistor 33 is turned off, by removal of the trigger signal, the capacitor 26 again charges to the selective voltage level to again turn on the transistor 13, with a time constant determined by the resistor 25 and capacitor 26.

In summary, each triggering of the reset transistor 33 discharges the capacitor 26 and resets the timing cycle for turning on of transistor 13 and de-energizing of the control relay 11. The timing circuit can be reset during any part of the timing cycle by merely turning on the reset transistor 33 for a length of time determined by the discharge time of the capacitor 26 and the current limiting resistor 35.

In the illustrated embodiment of the invention, the base 39 of the reset transistor 33 is connected to the pulse switch 8 in series with a coupling resistor 41 and a blocking capacitor 42. The positive side of the capacitor 42 is connected to the junction of the pulse forming switch 8 and a pulse forming resistor 44 which is connected to the positive voltage line 15. With switch 8 open, the capacitor 42 charges to the supply line voltage and holds base 39 negative and therefore transistor 33 off. Each closure of switch 8 creates a discharge path to ground for capacitor 42 and generates a negative going pulse to the base 39 of the reset transistor 33 and thereby biases the transistor to conduct. The timing capacitor 26 then discharges as previously described to provide the timed operation of the circuit. The flow responsive switch 12 provides a capacitor discharging action by connecting the positive supply line 15 to the base resistor 41 which creates a biasing voltage on base 39 which is positive with respect to the bias on the emitter 38.

Switch 12 is shown diagrammatically as including an operating arm or paddle 45 depending into the flow line 1. The paddle 45 is connected to a set of contacts 46 one of which is secured to a movable arm 47 which is integrally connected to paddle 45 for opening and closing of the contacts. In the absence of flow, paddle 45 depends vertically into the line 1 and holds the associated contacts 46 closed. As soon as flow is initiated, the paddle 45 is pivoted clockwise as viewed in the drawing by the flowing liquid and carries the arm 47 to open the associated contacts 46.

The contacts 46 are connected in series between the positive line voltage 15 and the junction of the coupling resistor 41 and the capacitor 42. In the absence of flow, the closed contacts 46 maintain a positive voltage signal on the base of the transistor 33 which conducts and holds the timing capacitor 26 discharged. Transistor 13 is thereby held off such that the transistor 30 conducts and energizes relay 11.

The operation of the illustrated embodiment of the invention is briefly summarized as follows.

In the standby position when flow has been terminated by de-energization of the motor 5, the flow responsive switch 12 will be in the standby position with contact 46 closed. This then applies a positive signal to the base of the reset transistor 33 to maintain relay 11 energized. Contacts 11–1 and 11–2 are therefore closed.

If for any reason relay 11 has dropped out, the reset switch 27 is momentarily closed to complete the connection of circuit 10 to ground. This will permit the transistor 30 to conduct and energize the relay 11 with the closing of the associated contacts 11–1 and 11–2. Closing of contacts 11–1 conditions the control unit 6 for operation and closing of the contacts 11–2 provides a latch circuit around the reset switch 27.

The relay 11 must be energized in the standby position. This provides a fail safe arrangement such that the relay 11 is de-energized and locks out the control unit 6 in much the same manner as the failure to reset the timing circuit in the event of line failure or other similar circuit malfunctioning which removes power from the interlock circuit 10.

The motor 5 and drive pump 4 are actuated by operation of control unit 6 to dispense liquid from the line 1. The flowing liquid pivots paddle 45 and opens flow responsive switch 12 thereby removing the positive voltage of line 15 from the base 39 of transistor 33 which will turn off. The capacitor 26 then begins to charge and if not discharged by closing of switch 8 rises to a level to trigger the transistor 13. However, with liquid flow, the meter and pulse generating unit 7 is actuated to produce intermittent cyclical actuation of the pulse generating switch 8. When ever the switch 8 is closed, a pulse signal is generated and coupled by the capacitor 42 to the transistor 33 which conducts for the period of the pulse. The capacitor 26 discharges and restarts the timing cycle. Consequently, de-energization of the relay 11 is prevented so long as pulses are transmitted by proper actuation of the transmitter contacts or switch 8. If the flow is maintained with the transmitter switch 8 broken, the operative connection to the meter unit 7 disrupted, or the like, the resetting pulses will not be applied to the reset transistor 33. The continued flow will also maintain the flow responsive switch 12 open. As a result, the transistor 33 remains non-conducting and the capacitor 26 charges to the firing level of the transistor 13. The transistor 13 then conducts and establishes an output signal applied to the transistor 29 of the inverting amplifier. Conduction of transistor 29 turns off transistor 30 and the relay 11 is de-energized. As a result, the asociated contacts 11–1 and 11–2 open. Opening of contact 11–1 prevents the operation of the control unit 6 for the application of power to the motor 5. The opening of the relay contact 11–2 opens the ground circuit of the interlock circuit 10 and prevents re-energizing of the relay 11 except through operation of the reset switch 26. Further, closing of switch 26 without correction of a defect will not permit delivery except for the timing period as the relay 11 will be de-energized as previously described. Access to the latter, of course, may be limited to authorized personnel through any suitable means to insure correction of the transmitting assembly and system before delivery is again provided.

This invention thus provides a very reliable means for maintaining continuous monitoring of a load system where it is desired to actuate a recording device or the like in accordance with the load function.

Various modes of carrying out the invention are contemplated as being within the scope of the following claims particularly pointing out and distinctly claiming the subject matter which is regarded as the invention.

I claim:

1. In a flow responsive control system for controlling and recording liquid flow wherein the flow is controlled by an electrically operated means and a pulse switch is driven by a flow meter and is connected to open and close a pulsing circuit to a quantity flow device, the improvement comprising a relay means having normally closed contacts for conditioning the electrically operated means, a timing circuit including a normally conducting transistor and a normally non-conducting transistor interconnected whereby the conducting transistor is turned off by turning on of the non-conducting transistor and the normally conducting transistor is then turned on a selected period after the non-conducting transistor reverts to its normal state, said timing circuit having input circuit means for connection to the pulsing circuit to fire the normally non-conducting transistor in accordance with the pulse transmission to the quantity flow device, and an amplifier having an input means connected to the output means of the normally conducting transistor and having an output means connected to control the relay means to operatively disable the electrically operated means if the liquid flow fails to successively actuate the pulse switch at a faster rate than said selected period.

2. The control system of claim 1 having a flow actuated switch driven by liquid and connected to a holding signal means and to the input circuit means, said switch being actuated in response to flow to disconnect the holding signal means.

3. In a flow responsive control system for controlling and recording liquid flow wherein the flow is controlled by an electrically operated means and a pulse switch is driven by a flow meter and is connected to open and close a pulsing circuit to a quantity flow device, the improvement comprising
- conditioning means for the electrically operated means,
- a timing circuit including a normally conducting switch means and a normally non-conducting switch means interconnected whereby the conducting switch means is turned off by turning on of the non-conducting switch means and time delay means producing a selected timed turn-off after the non-conducting switch means turns off, said timing circuit having input circuit means for connection to the pulsing circuit to actuate the normally non-conducting switch means in accordance with the pulse transmission to the quantity flow device,
- means connecting the timing circuit to actuate the conditioning means whereby a minimum flow rate is required to maintain said conditioning means actuated, and
- a flow actuated switch means driven by liquid flow and connected to a holding signal means and to the normally non-conductnig switch means, said flow actuated switch means being actuated in response to flow to operably disconnect the holding signal means.

4. In a flow responsive control system for controlling and recording liquid flow wherein the flow is controlled by an electrically operated means and a pulse switch is driven by a flow meter and is connected to open and close a pulsing circuit to a quantity flow device, the improvement comprising
- a timing circuit including a normally conducting transistor and a normally non-conducting transistor, a bias circuit for the normally conducting transistor including a capacitor-resistor timing circuit connected in a discharge circuit including the normally non-conducting transistor whereby conduction by the non-conducting transistor turns off the conducting transistor for the period of conduction plus a time delay period corresponding to the charging rate of the capacitor, said timing circuit having input circuit means for connection to the pulsing circuit to fire the normally non-conducting means in accordance with the actuation of the pulse switch, said pulse switch being actuated for a period at least corresponding to the discharge time of said capacitor, and
- an output means actuated by the output of the normally conducting transistor in response to an actuation of the pulse switch at a periodic rate less than said time delay period and connected to operate the electrically operated means.

5. The control system of claim 4 wherein said output means includes an inverting amplifier connected between the normally conducting transistor and a relay means, said relay means having normally open contacts connected to operate the electrically operated means and normally open contacts in said timing circuit.

6. In a flow responsive control system including an electrically operated load device and including a fluid transmission line having a fluid driven metering means in the line and a switch means driven by said metering means to open and close a pulsing circuit, the improvement comprising
- a relay means having contacts connected in circuit with said load device,
- a timing circuit including a normally conducting transistor and a normally nonconducting transistor interconnected whereby the conducting transistor is turned off by turning on of the nonconducting transistor and the normally conducting transistor is then turned on a selected period after the nonconducting transistor reverts to its normal state, said timing circuit having an input circuit means for connection to the pulsing circuit to fire the normally nonconducting transistor in accordance with the closing and opening of the pulse circuit, and
- means connecting the normally conducting transistor in circuit with said relay means to thereby control the energization of said relay means and the operation of said load device if the fluid flow fails to successively actuate the switch means at a faster rate than the selected period.

7. The control circuit of claim 6 wherein said relay means includes contacts connected in a supply circuit to said transistors to control supplying power to said transistors.

8. The control circuit of claim 6 having a switch actuated by the flowing fluid and connected in said input circuit means to provide a holding signal to the transistors in the absence of flow of the liquid.

References Cited by the Examiner
UNITED STATES PATENTS

| | | | |
|---|---|---|---|
| 2,798,213 | 7/1957 | Rowell | 340—213 |
| 2,807,008 | 9/1957 | Rowell | 340—213 |
| 2,807,011 | 9/1957 | Rowell | 340—213 |
| 3,097,310 | 8/1963 | Sevilla | 307—88.5 |
| 3,115,275 | 12/1963 | Hynd | 222—20 |
| 3,134,970 | 5/1964 | Kelly et al. | 340—214 X |
| 3,149,293 | 9/1964 | Farkas | 307—88.5 |
| 3,150,294 | 9/1964 | Dastidar | 340—213 X |
| 3,197,068 | 7/1965 | Corbin et al. | 222—59 |
| 3,216,434 | 11/1965 | Lovendahl | 222—30 X |

ROBERT B. REEVES, *Primary Examiner.*

CHARLES R. CARTER, *Examiner.*

K. N. LEIMER, *Assistant Examiner.*